Patented Oct. 10, 1950

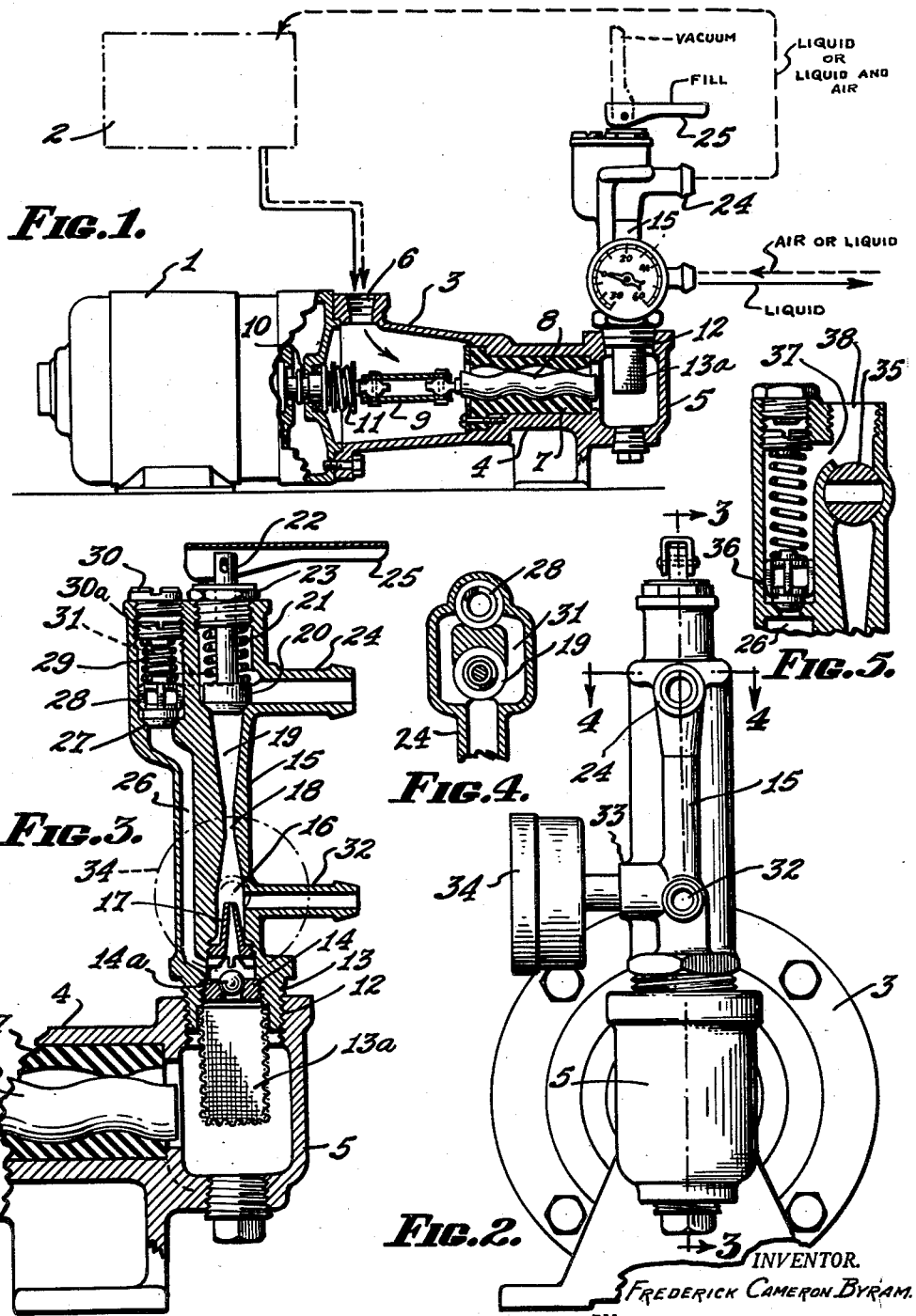

2,525,256

UNITED STATES PATENT OFFICE 2,525,256

FILLER AND DEFLATOR DEVICE

Frederick Cameron Byram, Springfield, Ohio, assignor to Robbins & Myers, Inc., Springfield, Ohio, a corporation of Ohio Application December 29, 1945, Serial No. 638,279

8 Claims. (Cl. 103—262)

My invention relates to a device for use more particularly in deflating tires and thereafter filling the tires with aqueous or other fluid when they have been deflated to the required amount.

In such a device a supply of the aqueous fluid is required, usually some salt solution, an air evacuator for the tire if the amount of fluid therein is intended to substantially fill the tire, and a pump to force the liquid into the tire. It is desirable that gauge means be provided as well as relief valve means so that the operator can control his operations accurately, and so that dangerous pressures may not be reached.

It is the object of my invention to provide equipment for this purpose utilizing preferably a motor driven pump, and using the known principle of an ejector coupled with a shut off valve beyond it, to operate the pump alternately as an evacuator for the tire and filler for the tire. Using this principle I am enabled to and positively to evacuate the tire of air using flow of liquid to accomplish this but without loss of any of the liquid. I can gauge accurately the low pressure requirements after evacuation and before filling, and also gauge accurately the filling of the tire with the fluid. I can also evacuate the fluid from the tire to substantial dryness and retain the solution which was in the tire for re-use.

It is my object to provide in a simple manner for the operations noted with a unitary pump attachment. This attachment will operate with any type of pump. I have selected for illustration the type of pump devised by R. Moineau, as shown in his Letters Patent No. 1,892,217. Because of its simplicity, its relatively continuous action and constant volumetric displacement, at selected speeds, this pump is ideal for my purposes.

While various constructional designs fall within the novel features of my invention I have selected, in the main, a single embodiment of my invention to illustrate it. I refer to the claims following this specification for statement of the novelty inherent in the example shown and described.

In the drawings, Fig. 1 is a side elevation partly in section of my device. Fig. 2 is an elevation facing oppositely to Fig. 1. Fig. 3 is a section on the line 3—3 of Fig. 2. Fig. 4 is a detail of the relief valve by-pass. Fig. 5 is an alternative discharge and safety valve arrangement.

The device is shown as driven by an electric motor 1, although it would as readily adapt itself to operation by the power take-off of a tractor or motor truck. A tank or vessel containing the required filling solution, say of calcium chloride and water is indicated at 2. The particular pump shown has a casing having a head 3, a cylinder 4 and a discharge head 5. The head 3 has a threaded opening 6 for hose connection with the tank 2. The pump itself comprises the spiral grooved stator cylinder 7, preferably formed of rubber and the rotor element 8 also spirally grooved but with a different pitch from the stator, as described in the Moineau patent above referred to. The stator is driven from a driving shaft 9 which is flexibly connected to a shaft 10. The latter shaft extends through a suitable seal 11, through a journal secured on the motor casing where it is connected to the rotor shaft of the motor.

Such a pump will draw fluid from the tank 2 and eject it into the discharge head portion 5 of the pump casing.

A threaded aperture 12 in the discharge head 5 serves to mount the control device. This device is formed of a metal casting having a threaded nipple 13 at one end to screw into the aperture 12. This nipple is internally threaded to receive a screen member or strainer 13a, and a valve seat 14 for a ball check valve 14a. The purposes of these two elements are to screen out materials from the fluid being pumped and prevent any return flow tendencies from tire back through the pump which facilitates tire pressure measurements.

Extending from the mounting nipple portion of the casting is an elongated portion 15 having a main bore 16. The lower portion of this bore is threaded for insertion of a jet nozzle 17. The bore narrows as at 18 and then expands again at 19 thus providing for an ejector effect. At the upper end of the portion 19 of the bore is a valve 20 spring biased by the spring 21 and with a stem 22 which projects through the clean out plug 23 that closes the top of this main bore of the casting. There is also an outlet pipe 24, shown as a part of the casting which projects from the bore beyond the valve 20.

To operate the valve its stem is connected to a handle 25 by means of a suitable pivot pin. This handle has a cam end so that when the handle is swung vertically it pulls up the valve from its seat, and when swung horizontally the valve is seated by its spring.

There is a second bore in the casting as shown at 26 which extends to valve seat 27. The relief valve 28 engages this seat and is biased to closed position by a spring 29, the compression of which is controlled by a screw 30a and screw cap 30 in the upper end of this bore 26. A communicating passage 31 formed in the casing (Fig. 4) passes around the portion main bore portion 19 and communicates with the outlet pipe 24.

Extending out from a portion of the casting just below the upper end of the jet nozzle 17 is the outlet pipe member 32 which is to be connected by a suitable hose with the tire valve of the tire to be operated on. A boss 33 on the casing opening into the lower portion of the bore 16 close to the location of the pipe member 32 communicates with the said bore 16, and serves to mount a combination pressure and vacuum gauge 34.

Instead of using the spring seated valve and branching pipe members 20 and 24 respectively, it may be desired to discharge the main bore of the casting directly instead of through right angle pipe. Such a construction is shown in Fig. 5. In this construction the valve for the main bore of the casting is a plug valve 35. The safety valve 36 is seated somewhat lower than the location of the plug valve and the bore 26 simply communicates as indicated at 37 with the opening 38 in the upper portion of the main bore in the casing. Into this opening 38 a discharge pipe may be threaded for hose connection with the supply tank 2.

A device constructed as now described operates as follows in operation on a vehicle tire:

If it is desired to fill the tire with liquid only partially say around 50%, the air in the tire is released by operating the tire valve with the weight off the tire until atmospheric pressure is all that the tire contains. The hose from the outlet pipe 32, which we may call the filler line, is then connected from said pipe to the tire valve and the pump is started into operation, with the valve 20 (or 35) closed. This will result in the liquid being forced by the pump through the strainer and out through the filler line into the tire. When the gauge registers the required pressure for this operation, which will be shown by calibrations on the gauge, the pump is stopped. To read true liquid pressure at a period previous to complete filling of the tire the pump should be stopped for a moment but the operator will soon learn to compensate for errors on the gauge due to flow past the gauge. During this operation the safety valve will prevent too high a pressure developing and in doing this will discharge liquid into the line back to the liquid tank. The ball check valve 14a will hold against loss through the pump by back pressure lockage.

If the operator wishes to place a larger percentage of liquid into the tire it is desirable to positively evacuate the tire. In this operation the valve 20 (or 35) is opened, and the filler line connected up to the tire. The liquid from the pump will then pass out through the ejector portion of the main bore and through the discharge pipe back to the liquid supply tank. This will set up a low pressure due to the action of the ejector portion and draw air or liquid or both from the tire and discharge it along with the liquid into the tank. When the required vacuum has been reached as indicated on the gauge, the valve 20 is quickly closed without stopping the pump whereupon the pump will discharge its contents through the filler line into the tire. By control of the amount of vacuum in the tire the amount of liquid which can be pumped into it until the pressure required has been attained, can be regulated. The relief valve setting will be such that the maximum permissible in the tire cannot be exceeded.

For evacuating the tire of liquid, the connections are the same as for evacuating air, therefrom an operation which should be carried on with the valve stem down, after letting all the liquid run out that will run out of its own accord, if desired. The tire may be subjected in this way to a high vacuum as a result of the ejector action which will remove almost all traces of moisture.

It will be noted that the device is connected into a closed system in so far as the tire is concerned, and a circulatory system, so far as the supply tank is concerned. The relationship established by the device could be employed to advantage in any such combined systems, and by reference to tire filling and evacuating I do not wish to limit myself to the field of utility. Thus while I mention the matter of a tire and a fluid supply therefor in the claims, this is intended to cover equivalent closed and circulatory systems.

Having thus described my invention, what I claim as new and desire to secure by Letters Patent is:

1. A means for alternately filling and evacuating a liquid container comprising a casing having two parallel longitudinally extending chambers therein connected to each other at spaced points, one of said chambers being formed to fashion a Venturi ejector tube, three nipples, one constituting an inlet for fluid under pressure, the second a suction inlet and the third a discharge outlet, a jet nozzle between said pressure inlet and said suction inlet and in alignment with the chamber forming the Venturi ejector tube, a valve for closing the connection between said ejector tube and said discharge outlet, thereby converting said suction inlet into a discharge outlet, and a relief valve in the other of said parallel chambers for relieving exhaust pressure by bypassing it to the discharge outlet.

2. A means for alternatively filling and evacuating a liquid container comprising a casing having two parallel longitudinally extending chambers therein connected to each other at spaced points, one of said chambers being formed to fashion a Venturi injector tube, three nipples, one constituting an inlet for fluid under pressure, the second a suction inlet and the third a discharge outlet, a jet nozzle between said pressure inlet and said suction inlet and in alignment with the chamber forming the Venturi ejector tube, a valve for closing the connection between said ejector tube and said discharge outlet, thereby converting said suction inlet into a discharge outlet, a relief valve in the other of said parallel chambers, and adjustable means for determining the pressure at which said relief valve will open.

3. A device for alternately evacuating and filling a container comprising an elongated casing having two longitudinally extending chambers therein connected to each other at spaced points, one of said chambers being formed to constitute an ejector Venturi tube, an inlet port at one end of said casing for entrance of fluid under pressure, a port at the other end of said casing for discharge of fluid from casing, and a port communicating with said Venturi tube at a point adjacent the inlet end thereof, a nozzle between said inlet port and said Venturi tube and aligned with said tube, a valve at the discharge end of said Venturi tube, and a relief valve in the other of said chambers to control fluid passage from a point at the inlet side of said nozzle to said discharge port.

4. A device according to claim 3 in which a check valve is disposed between said Venturi port and the inlet port, to prevent outward flow through said inlet port.

5. A device according to claim 3 in which said inlet port is provided with a strainer and a check valve, so that fluid entering said inlet port must first pass through said strainer and then through said check valve.

6. A device according to claim 3 in which a pressure gauge connection is provided in said ejector Venturi tube at a point between the discharge end of said nozzle and the entrance end of said Venturi tube.

7. A device according to claim 3 in which the valve at the discharge end of said Venturi tube is of the spring closing lever action type having only a fully open or a fully closed position.

8. A device according to claim 3, in which said relief valve is provided with a concealed but accessible locking adjustment, whereby constant opening settings at values between a predetermined minimum and maximum may be maintained.

FREDERICK CAMERON BYRAM.

REFERENCES CITED

The following references are of record in the file of this patent:

UNITED STATES PATENTS

| Number | Name | Date |
|---|---|---|
| 1,118,971 | Tomko | Dec. 1, 1914 |
| 1,481,985 | Chrisman | Jan. 29, 1924 |
| 1,892,217 | Moineau | Dec. 27, 1932 |
| 2,343,269 | Aaron | Mar. 7, 1944 |
| 2,349,594 | McMahan | May 23, 1944 |
| 2,415,019 | McMahan | Jan. 28, 1947 |